United States Patent [19]
Villa et al.

[11] Patent Number: 5,435,845
[45] Date of Patent: Jul. 25, 1995

[54] GLUCOHEPTONATE COMPOSITIONS AND METHODS

[75] Inventors: José L. Villa, Doylestown; Zvi Grauer, Dresher, both of Pa.

[73] Assignee: Henkel Corporation, Plymouth Meeting, Pa.

[21] Appl. No.: 146,348

[22] Filed: Nov. 2, 1993

[51] Int. Cl.$^6$ ............................................. C04B 24/10
[52] U.S. Cl. .................... 106/804; 106/724; 106/729; 106/823
[58] Field of Search ............... 106/804, 823, 696, 724, 106/725, 729, 126, 139, 162

[56] References Cited

U.S. PATENT DOCUMENTS

| | | | |
|---|---|---|---|
| 2,141,569 | 11/1932 | Tucker | 106/27 |
| 3,022,343 | 2/1962 | Behnke | 260/528 |
| 3,100,526 | 8/1963 | Martin et al. | 166/31 |
| 3,132,693 | 5/1964 | Weisend | 166/33 |
| 3,193,575 | 7/1965 | Nebel et al. | 260/505 |
| 3,277,162 | 10/1966 | Johnson | 260/505 |
| 3,351,478 | 11/1967 | Dodson et al. | 106/90 |
| 3,359,225 | 12/1967 | Weisend | 260/29.6 |
| 3,429,724 | 2/1969 | Keenum, Jr. et al. | |
| 3,503,768 | 3/1970 | Previte | 106/92 |
| 3,560,230 | 2/1971 | Previte | 789/969 |
| 3,686,133 | 8/1972 | Hattori et al. | 252/354 |
| 3,769,051 | 10/1973 | Hardin | 106/90 |
| 3,788,868 | 1/1974 | Kitsuda et al. | 106/90 |
| 3,954,491 | 5/1976 | Adrian et al. | 106/100 |
| 4,028,125 | 6/1977 | Martin | 106/89 |
| 4,036,659 | 7/1977 | Stude | 106/314 |
| 4,054,462 | 10/1977 | Stude | 106/90 |
| 4,083,407 | 4/1978 | Griffin, Jr. et al. | 166/291 |
| 4,088,504 | 5/1978 | Collepardi | 106/90 |
| 4,137,088 | 1/1979 | Debus et al. | 106/90 |
| 4,210,455 | 7/1980 | Metcalf et al. | 106/719 |
| 4,290,817 | 9/1981 | Villa et al. | 106/90 |
| 4,406,702 | 9/1983 | Joseph | 106/725 |
| 4,767,460 | 8/1988 | Parcevaux et al. | 106/724 |
| 4,961,789 | 10/1990 | Barrenechea | 106/804 |
| 5,108,511 | 4/1992 | Weigland | 106/728 |
| 5,236,501 | 8/1993 | Nomachi et al. | 106/723 |

FOREIGN PATENT DOCUMENTS 2415084  1/1978  France.

OTHER PUBLICATIONS

Technical Bulletin, "Belzak Glucoheptonates", Belzak Corporation, Clifton, N.J., 1991 no month.
"Amino Resins and Plastics", *Encyclopedia of Chemical Technology*, vol. 2, pp. 440–469, John Wiley & Sons, Inc., N.Y., N.Y., 1981, no month.
"Lignin", *Encyclopedia of Chemical Technology*, vol. 14, pp. 294–312, John Wiley & Sons, Inc., N.Y., N.Y., 1981 no month.
"Phenolic Resins", *Encyclopedia of Chemical Technology*, vol. 17 pp. 384–416, John Wiley & Sons, Inc., N.Y., N.Y., 1982. No month.
"Cement", *Encyclopedia of Chemical Technology*, vol. 5, 4th ed., pp. 564–598, John Wiley & Sons, Inc., N.Y., N.Y., 1993. No month.

*Primary Examiner*—Karl Group
*Assistant Examiner*—Paul Marcantoni
*Attorney, Agent, or Firm*—Wayne C. Jaeschke; John Daniel Wood; Daniel S. Ortiz

[57] ABSTRACT

Compositions and methods relating to cementitious compositions are provided. The use of a glucoheptonate in the alpha form to prolong the workability of cementitious compositions is provided. The alpha form of glucoheptonate (found to have properties superior to the beta form when used to retard the hydration of cementitious compositions) can be used in combination with a plasticizing resin, e.g. a naphthalenesulfonate/-formaldehyde condensate resin, to prolong the workability of a cementitious composition, without unacceptably delaying green strength development. Also provided are mixtures of a glucoheptonate in the alpha form and a naphthalenesulfonate/formaldehyde condensate resin plasticizer.

35 Claims, No Drawings

GLUCOHEPTONATE COMPOSITIONS AND METHODS

FIELD OF THE INVENTION

This invention relates to glucoheptonate compositions and their use in industrial products, e.g. in hydraulic cement systems.

BACKGROUND ART

Glucoheptonates such as sodium glucoheptonate were not commercially available until 1962 because suitable processes for their manufacture had not been developed. U.S. Pat. No. 3,022,343 (Behnke, issued Feb. 20, 1962) describes a process for producing sodium glucoheptonate syrup from commercial corn syrup and sodium cyanide. Solid sodium cyanide was added rapidly as a single charge to an aqueous solution of corn syrup having an initial temperature of 0° to 30° C. Sodium cyanide stoichiometrically equivalent to the combined dextrose and maltose content of the syrup, calculated as glucose was added. The reaction mixture was agitated until all of the cyanide was in solution and reaction was complete. Upon completion of reaction, the reaction mixture was simultaneously aerated and heated gradually to 70° C. The reaction mixture was aerated and maintained at 70° C. until no trace of cyanide was present in the mixture.

U.S. Pat. No. 2,141,569 (Tucker et al, issued Dec. 27, 1938) describes preparation and use of an alkali salt of a condensation product of naphthalenesulfonic acid and formaldehyde as a dispersing agent for cement particles to increase plasticity of a cement concrete mix.

U.S. Pat. No. 4,137,088 (Debus et al, issued Jan. 30, 1979) describes an additive combination for water containing setting building materials such as those based on cement containing an anionic polyelectrolyte, a low foaming nonionic surfactant and optionally a polyhydroxy monocarboxylic acid or polyhydroxy dicarboxylic acid. An additive combination of a salt of an anionic higher molecular weight condensation product of sulfonated naphthalene/formaldehyde resin, a block polymer of 90% of propylene oxide and 10% of ethylene oxide and a glucoheptonate salt is proposed.

Sodium glucoheptonate is also useful as a chelating agent in compositions for cleaning glassware and metals, paint stripping compositions, boiler scale removing compositions, radiator cleaners, germicidal compositions and the like. Sodium glucoheptonate is usually sold commercially in solution because it becomes a tacky substance on drying. It also has an ammoniacal odor resulting from byproduct ammonia which is objectionable to personnel handling glucoheptonate on an industrial scale.

Sodium salts of naphthalenesulfonic acid-formaldehyde condensates such as Lomar Registered TM D are used commercially as dispersing agents for cement particles in cement and concrete mixes.

U.S. Pat. No. 4,290,817 discloses that by-product ammonium ions remaining in an aqueous solution of a water soluble glucoheptonate salt after its synthesis are reacted with the free acid form of a naphthalenesulfonic acid-formaldehyde condensation product to obtain an aqueous composition which does not produce an ammonia odor when introduced into aqueous media having a pH above 9. It is also disclosed that the aqueous composition can be dried to obtain a flowable powder and that the product can be used to prolong the time of hydration of cement.

The technical bulletin "Belzak Glucoheptonates" discloses that two forms of glucoheptonate are commercially available from the Belzak Corporation, Clifton, N.J. One form is described as the crystalline dihydrate alpha isomer having a molecular weight of 284. The other form is described as a 50% aqueous solution of predominantly beta isomer having a molecular weight of 284. The bulletin also describes various applications and functions of glucoheptonates, including as concrete additives wherein the function of glucoheptonate is to retard set and/or act as a plasticizer.

SUMMARY OF THE INVENTION

This invention relates generally to the use of an alpha-glucoheptonate composition to improve the retention of workability (as opposed to retardation) of cementitious compositions. In one aspect, this invention relates to a cementitious composition comprising a hydratable cementitious material in a major amount by weight and a first minor amount by weight of a naphthalenesulfonate/formaldehyde resin and a second minor amount by weight of a glucoheptonate composition, said glucoheptonate composition consisting essentially of glucoheptonate of the alpha form, the ratio of said first minor amount by weight to said second minor amount by weight being greater than one and said second minor amount being effective to prolong the time of workability of said hydratable cementitious material. In preferred compositions, from about 0.001 to about 3% by weight (dry basis) of sodium alpha-glucoheptonate powder based on weight of cement is present to prolong the time of workability of the cementitious composition.

In a related aspect, this invention relates to a method of prolonging the workability of a cementitious composition comprising adding a glucoheptonate composition consisting essentially of glucoheptonate of the alpha form to a hydratable cementitious composition in an amount effective to prolong the workability of said cementitious composition. The effectiveness of the alpha form of glucoheptonate at prolonging the workability (e.g. improving the slump retention of a concrete mix), yet not unacceptably delaying strength development over a period of days, allows one a longer time to work the composition (e.g. move, shape, smooth, etc.), but to have acceptable green strength at one or two days so that impacts after one or two days will not crack the green-cured cement structure. In preferred methods, from about 0.05 to about 3% by weight (dry basis) of sodium alpha-glucoheptonate powder based on weight of cement may be added to a cement mix to prolong the time of workability of the cement.

In another aspect, this invention relates to a composition useful in prolonging the workability of a cementitious composition comprising a glucoheptonate component consisting essentially of glucoheptonate of the alpha form and a resinous plasticizer component for cementitious compositions. Each component is preferably present in an amount in relation to the other component that is effective to improve the performance of both components. The plasticizer component preferably consists essentially of dispersant resin. Examples of dispersant resins include carbonyl resins (e.g. the reaction product of a ketone, for example acetone, and a reactive carbonyl compound, for example formaldehyde) a condensate of an aromatic compound and a reactive carbonyl compound (i.e. an aromatic/carbonyl condensate, e.g. an aromatic/formaldehyde condensate resin, for example a xylene formaldehyde condensate), a condensate of an amine and a reactive carbonyl compound (i.e. an amino resin, e.g. a melamine formaldehyde resin) or a lignosulfonate resin. The plasticizer component is preferably a resin selected from the group consisting of a naphthalenesulfonate formaldehyde condensate, a xylene formaldehyde resin, a melamine formaldehyde condensate, and mixtures thereof. In preferred compositions, from about 50 to about 99% by weight of naphthalenesulfonic acid-formaldehyde condensation product is mixed with 1% to 50% by weight of a water soluble salt of the alpha form of glucoheptonate, such as sodium alpha-glucoheptonate. The mixture is preferably a dry flowable powder and can be a simple dry blend of the components. The mixture can also be in the form of a high solids aqueous composition which can be dried to obtain a flowable powder. Both the aqueous composition and the flowable powders are useful as additives in industrial products such as hydraulic cement mixes.

DETAILED DESCRIPTION OF THE INVENTION

This invention relates to the use of a glucoheptonate in the alpha-form, i.e. an alpha-glucoheptonate, with a cementitious composition. Glucoheptonates are prepared by the reaction of cyanide with glucose to form the corresponding cyanohydrins which are then hydrolyzed to the carboxylic acid or salt thereof. The compositions of this invention employ the alpha-form of glucoheptonic acid or water soluble salts of alpha-glucoheptonate, e.g. salts having as the counter ion a metal selected from the group consisting of sodium, potassium, lithium, calcium, magnesium, zinc, copper, iron, and mixtures of two or more thereof.

Sodium alpha-glucoheptonate is available commercially from Belzak Corporation, Clifton, N.J., in crystalline form as the dihydrate salt. This material has a moisture content of 0.5% maximum. (Thus, in preferred compositions of this invention, the glucoheptonate component will have a moisture content of 0.5% by weight or less.) Other salts, or the acid form, can be derived therefrom by ion exchange techniques.

Alternatively, a mixture of the alpha form and the beta form of sodium glucoheptonate can be prepared by adding to an aqueous solution of corn syrup cooled to a temperature in the range of 0°–30° C., preferably 0°–20° C., a quantity of sodium cyanide stoichiometrically equivalent to the dextrose and disaccharide content of the syrup, calculated as the glucose equivalent and agitating the reaction mixture until the sodium cyanide is completely dissolved. When this procedure is followed, aldoses and disaccharides present in corn syrup react with sodium cyanide before these sugars can be degraded by alkali liberated by hydrolysis of sodium cyanide. Commercially available corn syrups are essentially mixtures of dextrose, maltose, higher sugars and dextrins. Proportions of these components vary depending on methods employed in manufacturing the corn syrup. Dextrose and maltose are the major components in the syrup. Dextrose is an aldose and maltose is a disaccharide. The term "higher sugars" includes those sugars not falling within the collective group of aldoses and disaccharides. The term "sodium glucoheptonate syrup" includes not only the sodium glucoheptonates formed in the reactions involved in the above process but also the sodium salts of the sugar acids derived from all of the aldoses and disaccharides that may be present in the corn syrup. Corn syrups which are useful in the above process include Enzose TM Hydrol EO84 and EO81, Cerelose Registered TM Liquid Dextrose 2606, Royal Registered TM Glucose Liquid 2626 and Invertose Registered TM High Fructose Corn Syrup 2643 offered by Corn Products, Englewood Cliffs, N.J., 07632.

Within 3 to 4 hours after sodium cyanide addition, the reaction mixture is simultaneously aerated and heated to a temperature not in excess of 70° C. and maintained at that temperature under these conditions until no trace of cyanide is present in the mixture. Any suitable test for cyanide may be used. The Pagenstecher-Schonbein test is an excellent cyanide test. After removal of cyanide, solids content of the syrup mixture of the alpha form and the beta form of sodium glucoheptonate may be adjusted and cooled to room temperature. If necessary, the syrup may be concentrated by vacuum evaporation to 50% solids. Syrup produced by this procedure is light amber in color and has a pH range of 10–7.5. The alpha and beta forms of the glucoheptonate should then be separable by conventional techniques within the ordinary skill in the art.

The resin plasticizers useful herein are preferably selected from the group consisting of amino resins, lignin resins, and phenolic resins. Amino resins are described and discussed in "Amino Resins and Plastics", *Encyclopedia of Chemical Technology*, vol 2, pp. 440–469 (Kirk-Othmer, eds, John Wiley & Sons, Inc, N.Y., N.Y., 1978), lignin resins are described and discussed in "Lignin", *Encyclopedia of Chemical Technology*, vol 14, pp. 294–312 (Kirk-Othmer, eds, John Wiley & Sons, Inc, N.Y., N.Y., 1981), and phenolic resins are described and discussed in "Phenolic Resins", *Encyclopedia of Chemical Technology*, vol 17, pp. 384–416 (Kirk-Othmer, eds, John Wiley & Sons, Inc, N.Y., N.Y., 1982), the disclosures of each of which are incorporated herein by reference.

Naphthaleneformaldehyde sulfonic acid is also known as the naphthalenesulfonic acid-formaldehyde condensates, formalin condensates of beta-naphthalenesulfonic acid, condensation products of naphthalenesulfonic acid with formaldehyde. Naphthaleneformaldehyde sulfonic acid may be prepared by reacting a mixture of naphthalene, formaldehyde and sulfuric acid. It may be prepared by the processes described in U.S. Pat. No. 2,141,569 (Tucker et al, issued Dec. 27, 1938), U.S. Pat. No. 3,193,575 (Nebel et al, issued Jul. 6, 1965), and U.S. Pat. No. 3,277, 162 (Johnson, issued Oct. 4, 1966).

Naphthaleneformaldehyde sulfonic acid is a mixture of condensation products of naphthalenesulfonic acid and formaldehyde. It can be chromatographed by size exclusion chromatography through a column containing pore sizes which selectively separate molecular volumes according to size. The solvent chosen for the acid in chromatography should minimize solute-packing interaction and solute-solute interaction. The chromatogram gives a true molecular volume profile when the eluents are displayed on a detector-strip chart recorder display. For example, if the chromatogram for a sample of the sulfonic acid is the same as that for the sodium naphthaleneformaldehyde sulfonate in U.S. Pat. No. 3,954,491 (Adrian et al, issued May 4, 1976), the two anionic materials are identical. That is, the anionic materials from the acid have the same profile as the anionic materials from the sodium naphthaleneformaldehyde sulfonate having lowest elution volumes of from above 61 to about 70% of the total elution volume and equivalent elution volumes of from about 61 to about 70% of the total elution volume. The teachings in U.S. Pat. No. 3,954,491 relating to chromatography are incorporated by reference herein. The naphthaleneformaldehyde sulfonic acid resin can be in the acid form but is preferably in an essentially neutralized form, e.g. as a water soluble salt. The counter ion of the neutralized resin can be a metal selected from the group consisting of sodium, calcium, magnesium, lithium, zinc, and mixtures of two or more of said metals. Resins naphthalenesulfonate resins available from Henkel Corporation, Ambler, Pa., as Lomar D, are particularly preferred.

The water soluble salt of alpha-glucoheptonate and resin plasticizer, e.g. a naphthalenesulfonic acid-formaldehyde condensation product, may be mixed to obtain the improved composition. The composition will typically be comprised of a major amount (i.e. more than 50% by weight) of resin plasticizer and a minor amount (e.g. from about 1 to about 30%, preferably from about 10% to about 15% by weight) of a water soluble salt of alpha-glucoheptonate. The improved composition may be prepared by mixing from about 50% to about 99% by weight of resin plasticizer with a 50% by weight of a water soluble glucoheptonate salt solution. Further, an aqueous mixture of alpha-glucoheptonate and resin plasticizer may be dried (e.g. by spray drying) to obtain a solid brittle powder capable of being ground to a fine flowable powder. (In contrast, it has been found that the beta-form of glucoheptonate is not susceptible to spray drying to a flowable powder, even in admixture with a resin plasticizer such as a naphthalenesulfonate formaldehyde condensate. Thus, the spray-dryability of the alpha-form of glucoheptonate is a significant advantage if a dry flowable product is desired.) If desired, a carrier may be incorporated in the composition before or after drying. Water soluble alpha-glucoheptonate salts such as sodium, potassium, lithium, calcium, magnesium or zinc glucoheptonate may be used in these compositions with sodium alpha-glucoheptonate being preferred.

The improved alpha-glucoheptonate composition may be added to a cementitious, us composition, e.g. a grout or a concrete mix, at any convenient point during its preparation or use. For example, the crystalline composition or a dried flowable powder of the alpha-glucoheptonate and resin plasticizer may be added to portland cement clinker prior to grinding and thoroughly mixed with the cement during grinding. The crystalline alpha-glucoheptonate or the dried, powdered composition may also be blended with the ground cement. Either the powdered glucoheptonate composition or crystalline alpha-glucoheptonate composition may be added to the water in which the cement, sand and/or gravel are mixed. The cement may be premixed with water and then either the dried or liquid composition added. In general, either glucoheptonate composition may be added to the cement, mortar or concrete mix at any stage prior to final setting. Cement, mortar or concrete mixes include concretes, mortars, neat paste compositions, oil well cement slurries, grouting compositions and the like. Cementitious compositions are discussed in the encyclopedia article "Cement" cited below.

The cements used in the preparation of the cementitious compositions, especially concrete mixes include Type I, II and III cements. These cements are well known and are described in "Cement", Encyclopedia of Chemical Technology, (Kirk-Othmer, eds, John Wiley & Sons, Inc., N.Y., N.Y., 5th ed., 1993), vol. 5, pp. 564–598, the disclosure of which is incorporated by reference herein. These cements may be used to prepare, concrete mixes containing 100 parts by weight of cement, from about 140 to about 260 parts by weight of sand, from about 100 to about 200 parts by weight of gravel, from about 35 to about 60 parts by weight of water and an effective amount of glucoheptonate composition sufficient to prolong the time of hydration of cement particles in concrete. Preferred concrete mixes contain 100 parts by weight of cement, from about 160 to about 230 parts by weight of sand, from about 140 to about 180 parts by weight of gravel, from about 38 to about 50 parts by weight of water and an effective amount of glucoheptonate composition sufficient to prolong the time of hydration of cement particles in concrete mixes. The concentration of the glucoheptonate component in the concrete mixes may vary from about 0.001 to about 1% (by weight of cement), preferably from about 0.005 to about 0.1%, and most preferably from about 0.01 to about 0.05% to prolong the time of workability of the cement. After preparation, these concrete mixes are then allowed to harden to obtain hardened concretes.

In the drilling, completion and servicing of water, oil and gas wells, cement slurries are used to seal various portions of the well bore to anchor the well casing or for other purposes. The cement slurry may be pumped into the well bore under pressure and also subjected within the well bore to the hydrostatic pressure produced by a column of cement slurry which may be several hundred or thousand feet in height. Further, the slurry may be subjected to elevated temperatures within the borehole. These glucoheptonate compositions may be added to the cement slurry to prolong the time of workability of the cement in the slurry to permit proper placement of the cement slurry in the borehole.

Concentration of the glucoheptonate component in cement slurries may vary, as discussed above, to prolong the time of workability of the cement. Although the alpha form of glucoheptonate has been found to be more effective at increasing the slump retention (as measured by calorimetry as the time to third stage) and at retarding a cement's cure (as measured by calorimetry as the time to Qmax) than the beta-form, use of these amounts will not lead to an unacceptable increase in the hydration time of the cementitious compositions. The glucoheptonate compositions of this invention may be added to the slurry or admixed in dry form with the cement before it is slurried, or even pre-mixed with the water used to prepare the slurry.

The workability of the cement composition can be measured in a variety of ways. One means is the time to third stage in a calorimetry analysis of the curing cement composition. The third stage is the beginning of the acceleration of temperature increase which follows in time the first stage (the initial temperature spike typically at about 10 minutes after mixing) and the second stage (the induction period) and precedes in time the fourth stage. Loss of workability will typically occur at some time after the beginning of the third stage and prior to the fourth stage. The time of fourth stage is a measure of the retardation of hydration of a cement composition and is defined as the time of maximum acceleration of temperature change. Another means of measuring loss of workability is by Vicat needle penetrometry which measures the time after which a cylindrical needle of a 1 mm diameter and under a weight of 395 grams will not penetrate at least 25 mm into the curing cement composition.

For a fuller understanding of the nature and advantages of this invention, reference may be made to the following examples. These examples are given merely to illustrate the invention and are not to be construed in a limiting sense. While the invention has been described with reference to certain specific embodiments thereof, it is understood that it is not to be so limited since alterations and changes may be made therein which are within the full intended scope of the appended claims. All quantities, proportions and percentages are by weight and all references to temperature are °C. unless otherwise indicated.

EXAMPLES

Materials and Procedures

Tests determine the time of various stages of hydration for cement by measuring the temperature generated by the hydration of a sample of cement mortar in an isoperibol type calorimeter. The isoperibol calorimeter used in determining the time of hydration of the cement mortar is also known as an isothermal shield calorimeter, where the outer shield is maintained at a constant temperature throughout the test while the temperature of the specimen and specimen container is changing.

The calorimeter vessel includes an electric heater, a temperature measuring device (thermocouple) and the specimen being tested. Heat exchange between the calorimeter vessel and the shield is minimized by evacuating the space between them, by minimizing the amount of conductive material in the space, and by coating the relevant surfaces with a material of high reflectivity. A Dewar flask is satisfactory as a calorimeter vessel and shield for these tests.

The sample of mortar is placed in the calorimeter and the temperature probe inserted in the sample and the calorimeter sealed. The temperature time profile is recorded over a number of hours and the time to third stage (as an indicator of time of workability) is noted as well as the time to hydration (Qmax which is determined by the time required for the sample to reach maximum temperature acceleration). Further details on the procedure used in these tests are given below.

A 500 g sample of cement mortar paste was prepared using 50 g sand, 33 g portland cement (Allentown, type I) and water in a weight ratio of water to cement of 0.33. To this standard mortar was added the specific additive to be evaluated. The hydration time was recorded from the time that water came in contact with the cement. Concretes were prepared from 5457 grams of portland cement (Allentown, type I), 1108 grams of sand, 8260 grams of stone and water at the water:cement weight ratios noted below.

The standard mix with additive was prepared according to ASTM Designation: C192-69. The mix was placed in the sample container and inserted into the calorimeter. A temperature probe was inserted into the mix. The calorimeter was sealed and the temperature recorder started. After a number of hours in the calorimeter, the time at which the mortar reached maximum temperature was determined from the recorder chart.

The following additives are denoted as follows:

Additive A: sodium alpha-glucoheptonate (from Belzak Corp.)

Additive B: a mixture containing 9.5% by weight sodium gluconate and 3.5% by weight organic phosphate chelator (commercially available as Delvo stabilizer).

Additive C: lignosulfonate based retarder/superplasticizer (commercially available as Pozzolith 100-XR).

Additive D: corn syrup based retarder (commercially available as Admixture LL-961R).

Additive E: naphthalenesulfonate/formaldehyde condensate (commercially available as Lomar D, from Henkel Corporation).

Additive F: sodium beta-glucoheptonate (from Belzak Corp.).

Additive G: a superplasticizer cement additive (commercially available as Mighty 150 from Toyo Soda, Japan).

Example 1

A series of cement mortar pastes were prepared using the formulation set forth above and with the additive (at percent by weight of the paste) shown below. The times to third stage and maximum temperature are shown.

TABLE 1

| ADDITIVE | ADDITIVE (wt %) | ADDITIVE A (wt %) | TIME TO 3RD STAGE (hr) | TIME TO QMAX (hr) |
| --- | --- | --- | --- | --- |
| none | 0 | 0 | 2 | 8 |
| A* | 0 | 0.1 | 6 | 13 |
| E | 0.1 | none | <2 | 9 |
| E | 0.1 | 0.1 | 5 | 13 |
| E | 0.3 | none | 2 | 9 |
| E | 0.3 | 0.1 | 10 | 18 |
| E | 0.5 | 0.1 | 14 | 21 |
| C | 0.1 | none | 3 | 9 |
| C | 0.1 | 0.1 | 8 | 16 |
| C | 0.3 | none | 4 | 12 |
| C | 0.3 | 0.1 | 12 | 20 |
| C | 0.5 | 0.1 | 19 | 28 |

*data from previous experiment

Example 2

A series of concrete samples were prepared using the formulation set forth above and with the additive shown below (and at the percent by weight of the paste shown below). The times to third stage and maximum temperature and the compressive strengths at one, two and/or three days after preparation are shown below. The concretes were prepared with a water:cement weight ratio of 0.41 and 0.39 for 0.5% and 0.3%, respectively, of Additive C or Additive E.

TABLE 2

COMPRESSIVE STRENGTH DEVELOPMENT

| ADDITIVE | ADDITIVE (wt %) | ADDITIVE A (wt %) | SLUMP (in.) | TIME TO 3RD/QMAX (hr) | COMPRESSIVE STRENGTH (psi) | | |
|---|---|---|---|---|---|---|---|
| | | | | | 1 DAY | 2 DAY | 3 DAY |
| E | 0.3 | none | 4 | — | 3470 | 4470 | 4810 |
| E | 0.5 | none | 9.0 | —/8 | 3829 | 4880 | 5310 |
| E | 0.3 | 0.1 | 9.5 | — | 2520 | 4600 | 5380 |
| E | 0.5 | 0.1 | 10.5 | 10/18 | 2550 | 4670 | 5240 |
| C | 0.3 | none | 6 | — | 2580 | 4050 | 4530 |
| C | 0.5 | none | 10.5 | 16/26 | — | 2830 | 3400 |
| C | 0.3 | 0.1 | 9.5 | — | — | 3690 | 4180 |
| C | 0.5 | 0.1 | 11 | 31/41 | — | 1490 | 3180 |

Example 3

A series of cement mortar pastes were prepared using the formulation set forth above and with the additive shown below (and at the percent by weight of the paste shown below). The times to third stage and maximum temperature are shown below.

TABLE 3

| ADDITIVE | Conc. (wt %) | TIME TO 3RD STAGE (hr) | TIME TO QMAX (hr) |
|---|---|---|---|
| none | — | 2 | 8 |
| A | 0.1 | 6/6 | 13/13 |
| B | 0.1 | 9/12 | 17/19 |
| C | 0.1 | 5 | 11 |
| D | 0.1 | 4 | 12 |
| F | 0.1 | 4 | 12 |

Example 4

A series of concrete samples were prepared using the formulation set forth above and with the additive (at 0.1% by weight of the paste) shown below. The times to third stage and maximum temperature and the compressive strengths at one, two and/or three days after preparation are shown below. The concretes were prepared with a water:cement weight ratio of 0.4 1.

TABLE 4

| ADDITIVE | INITIAL SLUMP (in.) | TIME TO QMAX (hr) | COMPRESSIVE STRENGTH (psi) | | |
|---|---|---|---|---|---|
| | | | 1 DAY | 2 DAY | 3 DAY |
| none | 5" | — | 2270 | 3080 | 3680 |
| A | 8" | 13 | 2650 | 3500 | 3860 |
| B | 9" | 15 | 2370 | 3610 | 3900 |
| C | 6" | 11 | 2690 | 3790 | 3930 |
| D | 6" | 11 | 2650 | 1780 | 3860 |

A series of cement mortar pastes were prepared at a water:cement ratio of 0.34. To each of these pastes was added 0.35% by weight of additive E or a blend of additives E and A in the weight ratios shown below, along with the time to third stage and the time to maximum temperature.

TABLE 5

| RATIO OF ADDITIVE A:E (wt:wt) | TIME TO 3RD STAGE (hr) | TIME TO QMAX (hr) |
|---|---|---|
| 0:100 | 2 | 10 |
| 5:95 | 2 | 10 |
| 10:90 | 3 | 12 |
| 20:80 | 4 | 12 |

Example 6

A series of cement pastes similar to Example 6 (total additive at 0.35% by weight) were prepared and time to initial set (a measure of loss of workability) was measured by needle penetrometry (Vicat needle) as the time when penetration was limited to 25 mm. The results are shown below.

TABLE 6

| RATIO OF ADDITIVE A:E (wt:wt) | AMOUNT OF ADDITIVE (wt %) | TIME TO INITIAL SET (hr) |
|---|---|---|
| 0:100 | none | 3.8 |
| 10:90 | none | 5.6 |
| 15:85 | none | 5.9 |
| none | 0.35 | 4.6 |

A dry blend of sodium alpha-glucoheptonate and a naphthalenesulfonate formaldehyde condensate can be prepared as follows. Crystalline sodium alpha-glucoheptonate (Belzak Corp.) in an amount of 42 parts by weight is dissolved in 258 grams of deionized water. The resulting solution is added to 300 parts by weight of a high solids (42% by weight) solution of naphthalenesulfonate formaldehyde condensate (Lomar D, Henkel Corporation) and the resulting solution (600 parts by weight at 28% solids) is spray dried at an inlet temperature of 225° C. and outlet temperature of 100°–105° C. to yield a fine, free flowing powder with a tan or cream color. The material was still free flowing without signs of caking at three weeks of storage.

What is claimed is:

1. A composition of matter useful as a cementitious material comprising a hydratable cementitious material in an amount by weight of more than 50% by weight of said composition of matter, a first amount by weight of a plasticizing resin and a second amount by weight of a glucoheptonate composition, said first and second amounts by weight each being less than 50% by weight of said composition of matter, said glucoheptonate composition consisting of glucoheptonate of the alpha form, the ratio of said first amount by weight to said second amount by weight being greater than one and said second amount being effective to prolong the time of workability of said hydratable cementitious material.

2. A composition of claim 1 wherein said second amount is from about 0.05% to about 3% by weight on a dry basis.

3. A composition of claim 1 wherein said glucoheptonate composition consists of a water-soluble salt of alpha-glucoheptonate.

4. A composition of claim 1 wherein said glucoheptonate composition consists of a water-soluble salt of alpha-glucoheptonate selected from the group consisting of the alkali metals and the alkaline earth metals.

5. A composition of claim 1 wherein said glucoheptonate composition consists of a water-soluble salt of alpha-glucoheptonate selected from the group consisting of sodium, potassium, lithium, calcium, magnesium, copper, iron and zinc.

6. A composition of claim 1 wherein said glucoheptonate composition consists of sodium alpha-glucoheptonate.

7. A composition of claim 1 wherein said glucoheptonate composition is dry.

8. A composition of claim 1 wherein said glucoheptonate composition consists of alpha-glucoheptonates in crystalline form.

9. A composition of claim 1 wherein said cementitious material is a Portland cement.

10. A composition of claim 1 wherein said cementitious material is a Portland cement of type I, II, or III.

11. A composition of claim 1 wherein said plasticizing resin is selected from the group consisting of amino resins, lignin resins, and phenolic resins.

12. A composition of claim 1 wherein said plasticizing resin is a naphthalene formaldehyde condensate.

13. A method of retarding the hydration of a cementitious composition comprising adding a first amount by weight of a plasticizing resin and a second amount by weight of a glucoheptonate composition consisting of glucoheptonate of the alpha form to an amount of more than 50% by weight of said cementitious composition of a hydratable cementitious composition, said first and second amounts by weight each being less than 50% by weight of said composition of matter, the ratio of said first amount to said minor amount being greater than one, and said second amount being effective to prolong the time of workability of said cementitious composition.

14. A method of claim 13 wherein said second amount is from about 0.05% to about 3% by weight on a dry basis.

15. A method of claim 13 wherein said glucoheptonate composition consists of a water-soluble salt of alpha-glucoheptonate.

16. A method of claim 13 wherein said glucoheptonate composition consists of a water-soluble salt of alpha-glucoheptonate selected from the group consisting of the alkali metals and the alkaline earth metals.

17. A method of claim 13 wherein said glucoheptonate composition consists of a water-soluble salt of alpha-glucoheptonate selected from the group consisting of sodium, potassium, lithium, calcium, magnesium, copper, iron and zinc.

18. A method of claim 13 wherein said glucoheptonate composition consists of sodium alpha-glucoheptonate.

19. A method of claim 13 wherein said glucoheptonate composition is dry.

20. A method of claim 13 wherein said glucoheptonate composition consists of alpha-glucoheptonates in crystalline form.

21. A method of claim 13 wherein said cementitious material is a Portland cement.

22. A method of claim 13 wherein said cementitious material is a Portland cement of type I, II, or III.

23. A method of claim 13 wherein said plasticizing resin is selected from the group consisting of amino resins, lignin resins, and phenolic resins.

24. A method of claim 13 wherein said plasticizing resin is a naphthalene formaldehyde condensate.

25. A composition of matter useful as an additive to a cementitious material comprising an amount of more than 50% by weight of a plasticizing resin and amount of 50% or less by weight of a glucoheptonate component, said glucoheptonate component consisting of glucoheptonate of the alpha form, the relative amounts of said resin plasticizer and glucoheptonate composition being such that said composition is effective to prolong the time of workability of said hydratable cementitious material and to plasticize said cementitious material when said composition is added in an amount of 50% or less by weight of the resulting admixture to an amount of said cementitious material that is more than 50% by weight of the resulting admixture.

26. A composition of claim 25 wherein said amount of 50% or less by weight is from about 0.05% to about 3% by weight on a dry basis.

27. A composition of claim 25 wherein said glucoheptonate component consists of a water-soluble salt of alpha-glucoheptonate.

28. A composition of claim 25 wherein said glucoheptonate component consists of a water-soluble salt of alpha-glucoheptonate selected from the group consisting of the alkali metals and the alkaline earth metals.

29. A composition of claim 25 wherein said glucoheptonate component consists of a water-soluble salt of alpha-glucoheptonate selected from the group consisting of sodium, potassium, lithium, calcium, magnesium, copper, iron, and zinc.

30. A composition of claim 25 wherein said glucoheptonate component consists of sodium alpha-glucoheptonate.

31. A composition of claim 25 wherein said glucoheptonate component is dry.

32. A composition of claim 26 wherein said glucoheptonate composition consists of alpha-glucoheptonates in crystalline form.

33. A composition of claim 25 wherein said plasticizing resin is selected from the group consisting of amino resins, lignin resins, and phenolic resins.

34. A composition of claim 25 wherein said plasticizing resin is a naphthalene formaldehyde condensate.

35. A composition of claim 25 wherein said composition is a dry, flowable powder.

* * * * *

UNITED STATES PATENT AND TRADEMARK OFFICE
CERTIFICATE OF CORRECTION

PATENT NO. : 5,435,845
DATED : Jul. 25, 1995
INVENTOR(S) : Jose L. Villa, Zvi Grauer It is certified that error appears in the above-indentified patent and that said Letters Patent is hereby corrected as shown below:

In col. 5, line 44, after "cementitious", delete [, us].

In col. 9, line 42, delete [0.4 1] and insert --0.41--.

Signed and Sealed this

Third Day of September, 1996

Attest:

BRUCE LEHMAN

Attesting Officer     Commissioner of Patents and Trademarks